3,546,541
SUPERCONDUCTING CURRENT LOOP HAVING
PREFERENTIAL CURRENT FLOW
Donald G. Schweitzer, Bayport, and Peter D. Adams, Shoreham, N.Y., assignors to the United States of America as represented by the United States Atomic Energy Commission
Filed July 10, 1968, Ser. No. 743,700
Int. Cl. G11c 11/44; H01f 7/22, 7/18
U.S. Cl. 317—123                 4 Claims

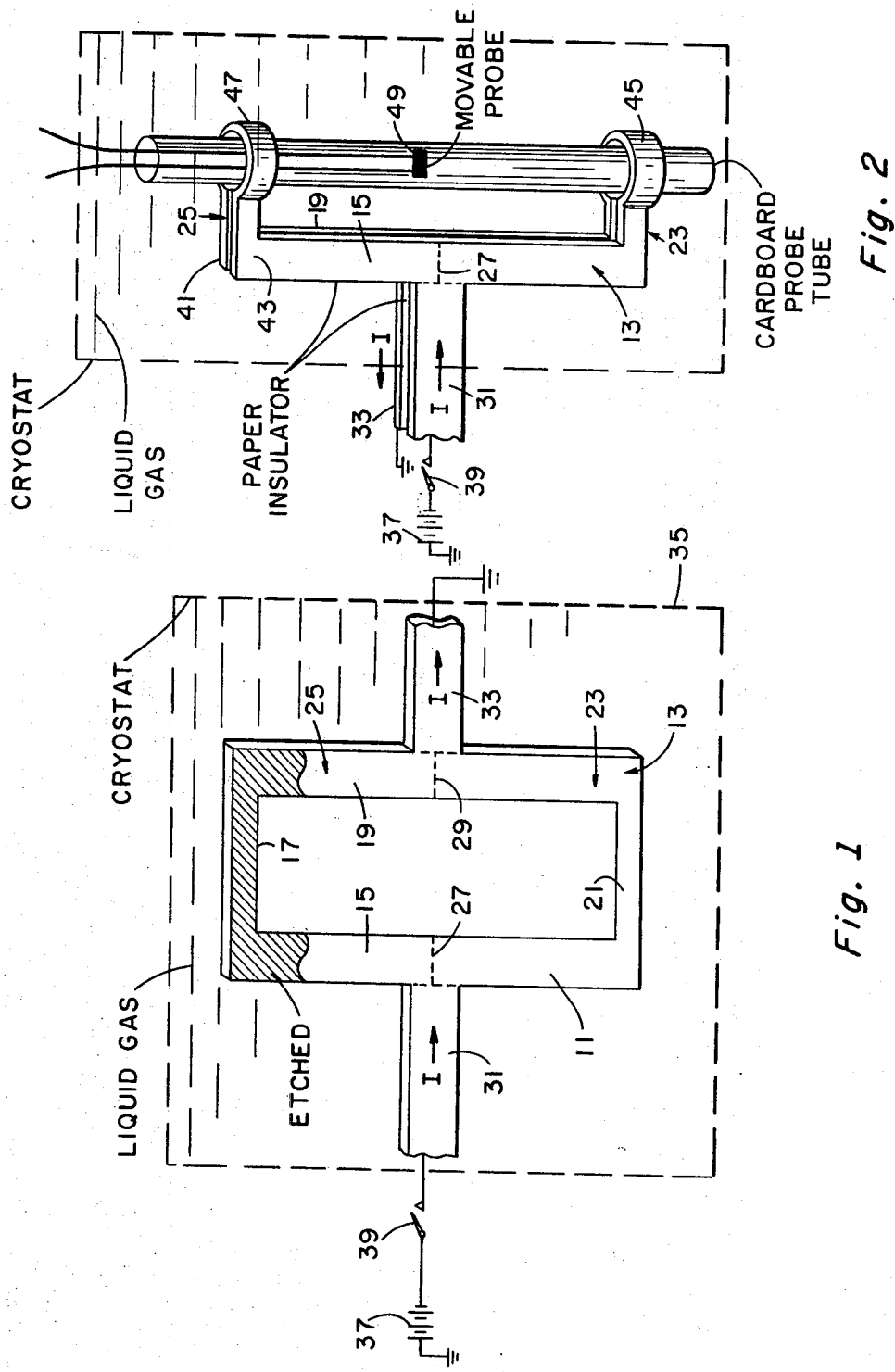

ABSTRACT OF THE DISCLOSURE

Superconducting current loop provided with strained and unstrained legs for producing preferential current flow in the strained leg thereof.

CROSS-REFERENCE TO RELATED APPLICATIONS

AEC Ser. No. 743,701, filed July 10, 1968 by Schweitzer and Nicolosi, "Strained Superconductor Magnet and Method," filed concurrently herewith; assigned to the assignee of this application.

BACKGROUND OF THE INVENTION

Field of invention

This invention relates to superconductive devices and more particularly to superconducting current loops.

Description of the prior art

In various industrial and research applications, it is advantageous to control the current flow in superconductor devices. Various methods and apparatus have been used therefor, such as the system described and shown in U.S. Pat. 3,156,850 wherein externally applied magnetic fields have been used to destroy superconductivity in a portion of a superconducting current loop. These systems, however, have not been able to produce preferential current flow in one side of the loop.

SUMMARY OF THE INVENTION

This invention was made in the course of, or under a contract with the U.S. Atomic Energy Commission.

In accordance with this invention, it has been discovered that preferential current flow can be produced in one leg of a current loop by straining that leg. In one embodiment, the superconducting loop has strained and unstrained legs for preferentially conducting more current from a source in one direction in the strained leg while a lesser current flows in one direction in the unstrained leg to produce a first field, and when disconnected from the source the loop provides a persistent current and field of the opposite sense along the unstrained leg whereby the loop provides selective information storage corresponding to the current in the loop.

Various other novel features will appear from the following description of two embodiments of this invention and the novel features will be particularly pointed out hereinafter in connection with the appended claims.

BRIEF DESCRIPTION OF THE DRAWINGS

In the drawings, where like elements are referenced alike:

FIG. 1 is a partial three-dimensional view of one embodiment of the current loop of this invention;

FIG. 2 is a partial three-dimensional view of another embodiment of the current loop of FIG. 1.

DESCRIPTION OF THE PREFERRED EMBODIMENT

Referring to FIG. 1, superconductor 11 forms a current loop 13 having four, symmetrical, equal length sides 15, 17, 19 and 21 forming two oppositely directed U-shaped legs 23 and 25 that connect respectively at two intersections, indicated by dashed lines 27 and 29. Also, the legs 23 and 25 have input and output means 31 and 33 connected to the two intersections 27 and 29.

As is well known in the art superconductor 11 is made from material that loses electrical resistance when cooled to its critical temperatures, $T_c$, as described in U.S. Pat. 3,177,408. Advantageously, superconductor 11 is a type I superconductor. As described on page 115 et seq. of the March 1967 Scientific American, these type I superconductors exclude increasing magnetic fields externally applied thereto until the critical field $H_c$ of the superconductor is achieved, at which point the field fully penetrates the superconductor and it changes to its normal resistance state. Also, as is understood in the art, the superconductor is cooled by liquid helium in a cryostat. To this end the current loop 13 is advantageously contained in a cryostat 35 having liquid helium filled therein. As is conventional, the temperature of loop 13 can be controlled by heating or cooling the liquid gas in cryostat 35 by suitable liquid circulating temperature control means (not shown), or by simply raising the loop 13 out of the cryostat into ambient room air and then selectively lowering the loop 13 from the air into the cryostat 35.

It will be understood that when the loop 13 has a normal resistance state, power source 37 conducts current equally in legs 23 and 25. For example, current flows from source 37 through input means 31, such as a superconducting lead, equally divides at intersection 27, flows equally in legs 23 and 25 from intersection 27 to intersection 29, and flows through output means 33, such as another superconducting lead, to a load, such as a resistance connected in a circuit to source 37.

Should one leg of loop 13, such as leg 23, be strained and one leg, such as leg 25, be etched to produce one strain free leg 25 and one strained leg 23 in accordance with this invention, and the loop be then inserted in cryostat 35 to cool the loop 13 below its critical temperature $T_c$, the strained leg 23 will preferentially conduct current from input 31 to output 33. In this case more than 50% of the total current "in" from source 37 will flow in one direction from left to right in the strained leg 23 and less than 50% of the total current "in" from source 37 will flow in one direction (from left to right) in the unstrained leg 25 from the input 31 to the output 33. Moreover, when the source 37, is disconnected from input 31, and provided the total current "in" is above a certain minimum value, a current persists in a counter-clockwise direction in loop 13 including a current from right to left in the unstrained leg 25. For example, this persistent current flows in strained leg 23 from left to right from intersection 27 to intersection 29, and in unstrained leg 25 from intersection 29 to intersection 27 from right to left to provide a circuit from leg 23 to leg 25. In actual tests the total current "in" from source 37 has been divided in legs 23 and 25 as follows: 60% to 70% of the total current flow "in" and "out" of input and output 31 and 33 in strained leg (e.g. leg 23 when input 31 is connected to source 37), and 30% to 40% of the total current flow "in" and "out" of input and output 31 and 33 in the unstrained leg (e.g., leg 25 when input 31 is connected to source 37). When the current source circuit is opened by opening switch 39, some of the difference between the currents in the two legs 23 and 25 persists in loop 13. The magnitude of the persistent current remaining in loop 13 after the source 37 is disconnected depends on the thickness of the superconductor.

In achieving preferential current flow in the embodiments shown in FIGS. 1 and 2, the samples were uniformly surface strained by sanding. A portion of one side 17 was then etched to remove the surface strains, as illustrated in FIG. 1. To make certain that no appreciable differences in inductance or geometry existed between the two legs 23 and 25 after measurements were completed, the etched leg was strained and the strained leg was etched. The results obtained by alternating the strained and strain free legs were the same to within experimental error. Additionally, the symmetry of the samples was confirmed from experiments that showed that both legs produced equal fields in their normal state.

Data were obtained from measurements of 15 mil thick plates of pure polycrystalline Pb and Sn at 4.2° K. with average grain sizes from $\sim 10^3$ to $10^4$ microns, and where the widths of the legs 23 and 25 were 150 mils. Advantageously the legs were spaced sufficiently far apart for a given current therein so that no field interactions occurred. The results obtained were precise, reproducible and independent of the width of the current leads when they exceeded the width of the sides of the current loop.

Advantageously, the loop 13 is made from a plate of 99.99% pure Pb or Sn of uniform thickness cut in the symmetrical picture-frame shaped geometry shown in FIG. 1. Sandblasting advantageously produces the straining. However, straining may be produced by any of a variety of means, as described in the above cited copending application filed concurrently herewith. These straining means, comprise sandblasting, with $50\mu$ aluminum oxide or other particles of various size particles, machining, sanding with various grades of silicon carbide cloth, or other cloth or sand paper, strain elongation, mechanical twisting and/or various chemical procedures. For example, slow, prolonged oxidation in moist air produces strained surfaces, comprising oxides, hydroxides and carbonates with occasional localized pitting, which generate dislocations resulting in a gradual increase of preferential current flow with oxidation time. On the other hand, rapid oxidation of an etched Pb sample in a 200° C. flowing air stream produces insufficient localized straining for the preferential current flow effect of this invention.

Also, etching may be provided by a variety of means, as described in the above-cited copending application filed concurrently herewith. Advantageously, the etch solution is 20 volume percent of $H_2O_2$ in glacial acetic acid, but 5% concentrated nitric acid in methyl alcohol may alternately be used.

In operation, the embodiment of FIG. 1 is used to make the device of FIG. 2, which provides a resistance-free electrical apparatus that may be used for storing information or producing predetermined magnetic fields and/or field gradients. To this end the apparatus of FIG. 1 forms a closed loop 13 of type I superconductor in the form of a symmetrical picture frame shaped rectangular sheet of uniform thickness and uniform width having a strained leg 23 and an unstrained leg 25. These legs are each bent to form a pair of parallel, adjacent members 41 and 43 that are interconnected at each end thereof and secondary open loops 45 and 47, as shown in FIG. 2. When a unidirectional current source 37 is connected through input 31 to the unbent sides 15 and 19 at the midpoints thereof, a conventional magnetic field probe means 49 senses the direction and current flow developed by the secondary open loop 47 formed by the unstrained leg 25 by indicating a first magnetic field strength and a first magnetic field sense. When the current source 37 is disconnected from loop 13, and thereby from this unstrained secondary loop 47, by opening a switch, like switch 39 between the source 37 and the input 31, a persistent lower magnetic field of the opposite sense is detected by probe 49 in this loop 47. The probe 49 thus detects this magnetic field information whereby the device of FIG. 2 provides information storage corresponding to the current flow in the loop 13.

It will also be understood from the above that the magnetic field produced by the strained secondary loop 45 in its superconducting state produces a first high field of one sense when connected to source 37 and a second lower field of the same sense when this loop is disconnected from source 37 by opening switch 39. It will additionally be understood from the above that the sense of the current flow in the various primary and secondary loops described and the various legs and sides thereof, can be changed from one sensde to the opposite sense in their superconducting state by reversing the current flow in the input and output leads 31 and 33. Likewise, as described above, the current "in," e.g., along the input 31, can be equally divided in the strained and unstrained legs by driving the whole loop apparatus of FIG. 2 into its normal resistance state. To this end, this normal resistance state can be obtained by exceeding the critical current or critical field $H_c$ of the apparatus or by exceeding the critical temperature $T_c$ thereof. Thereafter, the apparatus can be made superconducting as is well known in the art, by lowering the current from its critical level, removing the critical field, which as is well understood can be externally applied, and/or by cooling the apparatus to below its critical temperature $T_c$.

This invention has the advantage of producing preferential current flow in a strained leg of a superconducting current loop having a strained leg and an unstrained leg. Moreover, by suitably bending the unstrained leg into a secondary current loop, current therein flows in one direction when connected in a first circuit with a power source and persists in the reverse direction when the current source is disconnected therefrom. This has the advantage of providing a simple, effective, and foolproof device for storing the information sense of the current flow in the loop as well as information corresponding to the connection and/or disconnection of the loop from the power source.

What is claimed is:

1. Apparatus for providing preferential current flow at superconducting temperatures, comprising means consisting of a system of superconductors that are selectively strained with strains that can be removed by etching, said superconductors forming a primary current loop of superconductor material having input and output leads, and respective equal length first and second relatively strained and unstrained legs with adjacent ends connected to said leads, the adjacent ends of the first and second legs being connected to one of the leads, the other adjacent ends of the first and second legs being connected to the other lead, and said unstrained leg being selectively etched for removing strain therefrom relative to said strained leg for providing for said preferential current flow in said strained leg at said superconducting temperatures.

2. The invention of claim 1 in which said unstrained leg forms a secondary open loop in series with a like open loop formed by said strained leg, and a direct power source connected therewith and in series to said strained leg through said input and output leads, said source causing a current to flow through the etched leg in a first direction, and said strained leg having a second persistent current in the opposite direction when the power source is removed and the loop is at its superconducting temperature.

3. The invention of claim 1 having an unstrained leg forming a secondary open loop for producing a magnetic field corresponding to the current flow therein, a direct power source connected to said input and output leads, said source causing a current to flow in one direction in said etched leg, said strained leg having a second persistent current in the opposite direction when the power source is removed and said primary loop is at its superconducting temperature, and magnetic field probe means responsive to said magnetic field for determining the strength and direction of said current flow in said secondary open loop.

4. The invention of claim 1 having means for selectively maintaining said current loop above and below its superconducting temperature, and means for selectively producing a current flow through said loop from said input to said output leads whereby said current divides the current flow in said strained and unstrained legs when said loop is in its normal resistance state, and said strained leg provides preferential current flow over said unstrained leg when said current loop is superconducting.

References Cited

UNITED STATES PATENTS

| | | | |
|---|---|---|---|
| 3,262,026 | 7/1966 | Rosner | 335—216 |
| 3,021,434 | 2/1962 | Blumberg et al. | 340—173.1 |
| 3,059,196 | 10/1962 | Lentz | 338—32 |
| 3,184,674 | 5/1965 | Garwin | 323—44 |
| 3,082,408 | 3/1963 | Garwin | 340—173.1 |
| 2,983,889 | 5/1961 | Green | 338—32 |

J. D. MILLER, Primary Examiner

C. L. YATES, Assistant Examiner

U.S. Cl. X.R.

338—32; 340—173.1